Patented Aug. 3, 1954

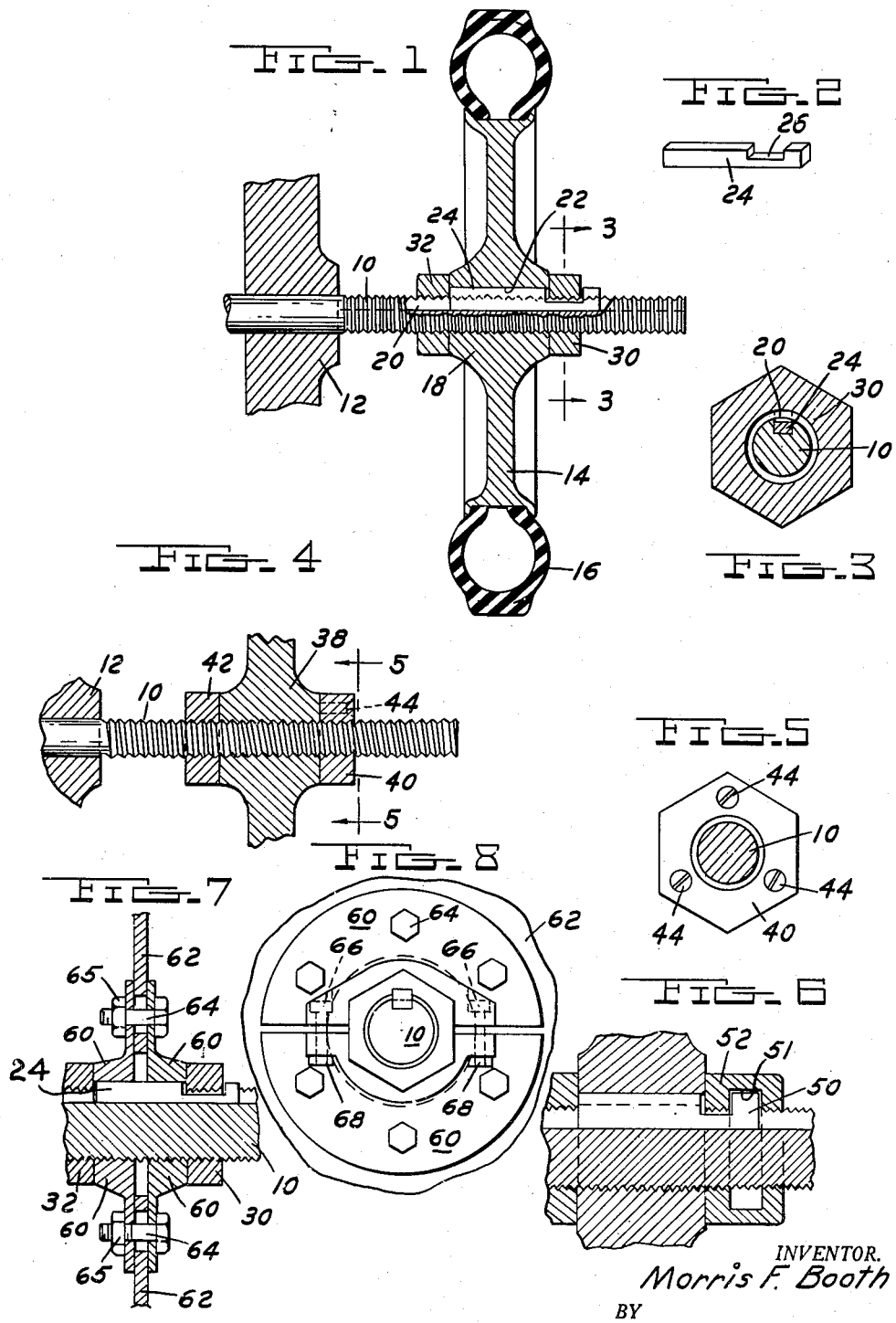

2,685,478

UNITED STATES PATENT OFFICE 2,685,478

TRACTOR WHEEL LOCATOR

Morris F. Booth, Alden, Mich.

Application May 19, 1949, Serial No. 94,215

6 Claims. (Cl. 301—1)

This invention relates to a tractor wheel locator and has particularly to do with a device for locating a tractor wheel on a threaded axle.

Recent developments in tractor construction have included a tractor wheel design which permits in and out adjustment of the tractor wheels for various uses in agricultural pursuits. The present invention contemplates a tractor wheel adjustment in which the extending ends of the power driven axle are threaded and the hub of the wheel is also threaded in a corresponding manner so that when the wheel is loose on the axle a turning of the axle by the tractor engine will cause a shifting of the wheel on the axle to the extent desired. With this arrangement it is necessary to have a means of locking the tractor wheel on the axle to prevent shifting of the wheel when not intended and to permit the transmission of the requisite power from the axle to the wheel.

Briefly, this locking means, according to the present invention, consists of a nut on each side of the wheel hub and in one embodiment a spline cooperating with the wheel and the axle to lock the two together, this spline being shiftable by one of the nuts both in and out of its locking position. Other objects and features of the invention will be apparent in the following description and claims.

Drawings accompany the specification and the various views thereof may be briefly described as:

Figure 1, a sectional view through a wheel and axle showing one embodiment of the locking means.

Figure 2, a perspective view of the locking spline.

Figure 3, a sectional view on line 3—3 of Figure 1.

Figure 4, a sectional view of wheel hub and axle showing a locking system without the spline.

Figure 5, a view on line 5—5 of Figure 4.

Figure 6, a view showing a modified spline and nut association.

Figure 7, a vertical section showing a split hub assembly.

Figure 8, an elevation of the split hub arrangement.

Referring to the drawings, a tractor axle 10 is shown projecting from a housing 12 and supporting a wheel 14 having a usual heavy tread tire 16. The hub 18 of the wheel is threaded internally to correspond with the heavy threads on the axle 10. Along the threaded portion of the axle a spline-way 20 has been provided and similarly the hub of the wheel is splined at 22.

A spline 24, shown in Figure 2, is dimensioned to have an overall thickness equal to the combined depths of the two spline-ways. The spline 24 is notched at 26 so that the total thickness at 26 is such that the spline lies within the root of the threads on the axle.

As shown in Figure 1, there are two nuts 30 and 32 hexagonal in shape and lying on either side of the hub 18. These nuts are of heavy construction, and the notch 26 has a length slightly greater than the thickness of nut 30. Thus, nut 30 may be hung over the spline 26 as it enters the spline-way 20 and as the nut threads on the axle it will carry with it the spline. Similarly, when the nut 30 is threaded off the axle, it will automatically pull the spline 24 from position.

When it is desired to shift the wheel 14 on the axle, the nuts 30 and 32 can be loosened and the spline 24 may be pulled from the wheel by action of the nut 30. The axle may then be rotated to shift the wheel either in or out and then the nuts may be again drawn tight against the sides of the hub.

In the embodiment shown in Figure 4, the axle 10 is not splined. The hub 38 shown in Figure 4 has on either side nuts 40 and 42 hexagonal in shape. The nut 40 is provided with tapped holes to receive set screws 44 which lock the nut 40 against the hub 38.

Adjustment of the hub 38 on axle 10 is accomplished by releasing both nuts 40 and 42 to the extent desired and rotating the axle to shift the threaded hub laterally. When the nuts are again tightened, the axle is ready for operation.

In Figure 6, I have shown a modified type of spline 50 similar to that shown in Figure 2 but arranged to cooperate with an annular groove 51 inside a nut 52. Operation of this device is much the same as the embodiment shown in Figure 1.

In Figures 7 and 8 I have shown a split hub arrangement with nuts disposed on each side of the threaded hub. Flanges of half-hub portions 60 are joined to the disc of a wheel 62 by bolts 64 held in place by nuts 65. On either side of the wheel, bushings on the split hubs 60 are clamped on the axle 10 by bolts 66 and nuts 68. A spline 24 serves as in Figure 1 to lock the wheel on the hub. Release of nuts 65 and 68 will free the wheel. Nuts 30 and 32 will be shifted as before described. After the wheel is moved by axle rotation, the parts are again tightened into place and the wheel is ready for action.

It will thus be seen that I have provided a threaded axle and hub locking device which is simple to operate and which in the various embodiments provides a positive locking of the wheel for power transmission.

What I claim is:

1. A device for the lateral shifting and locking of a tractor wheel on an extended axle which comprises a threaded end on said axle, a wheel having a threaded hub to receive said axle, a threaded nut on each side of said hub, a splineway formed in said axle, and an annular groove formed inside one of said nuts, and a spline shaped to slide in said spline-way, and means on said spline projecting into the annular groove of said nut whereby movement of said nut on the axle will cause movement of the spline.

2. A device for the lateral shifting and locking of a tractor wheel on an extended axle which comprises a threaded end on said axle, a wheel having a threaded hub positioned on said axle, and a threaded nut on said axle on each side of said hub adapted to be forced against the hub to lock the same in place on the axle, spline-ways formed in said axle and said hub to receive a common spline, a spline positioned and slidable in said spline-ways having a uniform cross-section within said hub, means on one of said nuts and means formed in said spline engageable wherein axial travel of the two is mutually extensive and simultaneous.

3. A device for the lateral shifting and locking of a tractor wheel on an extended axle as defined in claim 2 in which the hub is split diametrically, and means is provided to clamp the split hub on the axle.

4. A device for the lateral shifting and locking of a tractor wheel on an extended axle as defined in claim 2 in which the tractor wheel has a disk center, a split hub formed of semi-circular threaded sections having radial flanges to be adjustably fastened to said wheel, and central bushings to be drawn together by mechanical means to clamp the hub on the axle.

5. A device for the lateral shifting and locking of a tractor wheel on an extended axle which comprises a threaded end on said axle, a wheel having a threaded hub positioned on said axle, and a threaded nut on said axle on each side of said hub adapted to be forced against the hub to lock the same in place on the axle, spline-ways formed in said axle and said hub to receive a common spline, and a spline notched near one end at least to the depth of the roots of the threads on the axle and of sufficient length to receive a radial segment of one of said nuts whereby the spline will shift with movement of the nut on the axle, and said spline at the other end having a uniform cross-section to extend the axial length of the hub.

6. A device for the lateral shifting and locking of a tractor wheel on an extended axle which comprises a threaded end on said axle having a spline-way formed in the outer surface thereof, a wheel having a threaded hub to receive said axle, a spline-way formed in the threaded surface of said hub, a nut threaded on said axle to be positioned on the inside of said hub, a second nut threaded on said axle to be positioned on the outside of said hub, a spline shaped to slide freely in said spline-ways having one longitudinal portion dimensioned to be received within and to extend throughout the axial length of said hub, and having a second portion notched and arranged to be positioned on the outer side of said hub, said second nut lying outside said hub and operating within the notch of said spline whereby movement of said second nut on the axle will cause movement of said spline.

References Cited in the file of this patent

UNITED STATES PATENTS

| Number | Name | Date |
|---|---|---|
| 856,199 | Albert | June 11, 1907 |
| 1,118,745 | Greasey | Nov. 24, 1914 |
| 1,769,105 | Bogg | July 1, 1930 |
| 2,235,457 | Lorimer | Mar. 18, 1941 |
| 2,324,681 | Dekker | July 20, 1943 |
| 2,472,742 | Brown | June 7, 1949 |